US011938644B2

(12) United States Patent
Scimone et al.

(10) Patent No.: US 11,938,644 B2
(45) Date of Patent: Mar. 26, 2024

(54) CUTTING DEVICE WITH SELECTIVELY LOCKABLE ACTUATING MEMBER

(71) Applicant: Slice, Inc., San Jose, CA (US)

(72) Inventors: Thomas Scimone, Campbell, CA (US); Scot Herbst, Santa Cruz, CA (US); Robert Joseph Gallegos, Fremont, CA (US)

(73) Assignee: Slice, Inc., Sunny Isles, FL (US)

( * ) Notice: Subject to any disclaimer, the term of this patent is extended or adjusted under 35 U.S.C. 154(b) by 318 days.

(21) Appl. No.: 16/155,240

(22) Filed: Oct. 9, 2018

(65) Prior Publication Data

US 2020/0108515 A1 Apr. 9, 2020

(51) Int. Cl.
*B26B 5/00* (2006.01)
*A47L 13/08* (2006.01)

(52) U.S. Cl.
CPC .............. *B26B 5/003* (2013.01); *A47L 13/08* (2013.01)

(58) Field of Classification Search
CPC ........... A47L 13/08; B26B 1/08; B26B 5/001; B26B 5/003
See application file for complete search history.

(56) References Cited

U.S. PATENT DOCUMENTS 2,404,141 A * 7/1946 Nelson .................... B26B 5/006 30/162
2,601,723 A * 7/1952 Keller ....................... A47L 1/16 30/162
2,948,961 A * 8/1960 Ortner ..................... B26B 5/001 30/162
3,964,162 A * 6/1976 Gerson .................. B44D 3/164 30/162
4,558,517 A * 12/1985 Gringer .................. B44D 3/164 30/162
5,025,558 A * 6/1991 Gilbert .................... B26B 5/001 30/125
5,433,004 A * 7/1995 Thompson ............. A47L 13/08 30/169
5,502,896 A * 4/1996 Chen ....................... B26B 5/002 30/162
6,513,246 B2 * 2/2003 Ping ........................ B26B 5/001 30/125
6,553,674 B1 * 4/2003 Budrow .................. B26B 5/001 30/125
7,131,204 B2 * 11/2006 Brown .................... B26B 5/001 30/162
8,220,161 B2 * 7/2012 Chang ..................... B26B 5/001 30/162
10,220,527 B1 * 3/2019 Marfione .................. B26B 1/08
(Continued)

*Primary Examiner* — Evan H Macfarlane
*Assistant Examiner* — Fernando A Ayala
(74) *Attorney, Agent, or Firm* — Ellenoff Grossman & Schole LLP; James M. Smedley; Alex Korona

(57) ABSTRACT

A cutting device is disclosed. The cutting device has a first housing member, a second housing member that is removably attachable to the first housing member to form a housing, and a cutting assembly that is movably disposed in the housing, the cutting assembly including an urging member, an actuating member, and a cutting member. The housing includes a first recess and a second recess. The actuating member includes a protrusion that is selectively receivable in the first recess and in the second recess. The urging member biases the actuating member toward the first and second recesses.

21 Claims, 7 Drawing Sheets

(56) References Cited

U.S. PATENT DOCUMENTS

| | | | | |
|---|---|---|---|---|
| 2003/0136005 | A1* | 7/2003 | Panfili | A47L 13/022 30/162 |
| 2007/0175045 | A1* | 8/2007 | McHenry | B26B 1/08 30/162 |
| 2014/0101943 | A1* | 4/2014 | Chu | B26B 1/08 30/162 |
| 2014/0173912 | A1* | 6/2014 | Scimone | B26B 1/00 30/162 |
| 2014/0230254 | A1* | 8/2014 | Wu | B26B 5/00 30/169 |
| 2014/0290070 | A1* | 10/2014 | Landwehr | A47L 13/08 30/169 |
| 2016/0167239 | A1* | 6/2016 | Gallegos | B26B 5/003 30/162 |
| 2018/0250837 | A1* | 9/2018 | Dias Baptista | B26B 5/003 |

* cited by examiner

CUTTING DEVICE WITH SELECTIVELY LOCKABLE ACTUATING MEMBER

TECHNICAL FIELD

The present disclosure generally relates to a cutting device, and more particularly to a cutting device having one or more replaceable blades.

BACKGROUND

A scraper is a basic cutting tool that may be provided in a variety of forms. A scraper may be used in many applications such as removing undesired material from a surface, smoothing or levelling a surface, or preparing a surface for a desired use or further treatment.

Conventional scrapers may pose a safety risk to users or present a chance of unintentional damage to material or objects located in a work location. For example, conventional scraping devices typically have a constantly exposed blade or covers that may be easily misplaced or lost. Conventional scrapers also typically include relatively sharp blades that may pose the potential for accidental cutting of objects, users, or others.

Accordingly, conventional scrapers are often carried, stored, and left unattended with a relatively sharp, exposed blade that may pose the potential for accidents to users and others, as well as accidental damage to property. Also, many conventional scrapers do not have replaceable blades that may be changed when a blade becomes dull or worn, and instead the entire scraper is thrown away once a blade is damaged or becomes dull. Accordingly, a need for a way for efficiently avoiding inadvertent cutting of objects and users, efficiently avoiding loss of easily misplaced caps and covers, and efficiently providing a scraper having a replaceable blade exists in the art.

The exemplary disclosed cutting device and method of the present disclosure is directed to overcoming one or more of the shortcomings set forth above and/or other deficiencies in existing technology.

SUMMARY OF THE DISCLOSURE

In one exemplary aspect, the present disclosure is directed to a cutting device. The cutting device includes a first housing member, a second housing member that is removably attachable to the first housing member to form a housing, and a cutting assembly that is movably disposed in the housing, the cutting assembly including an urging member, an actuating member, and a cutting member. The housing includes a first recess and a second recess. The actuating member includes a protrusion that is selectively receivable in the first recess and in the second recess. The urging member biases the actuating member toward the first and second recesses.

In another aspect, the present disclosure is directed to a method. The method includes removably attaching a first housing member to a second housing member to form a housing, selectively locking the first housing member to the second housing member, and selectively unlocking the first housing member from the second housing member. The method also includes movably disposing a cutting assembly in the housing, selectively moving the cutting assembly between an extended position and a retracted position based on pressing the cutting assembly in an actuating direction that selectively removes a protrusion of the cutting assembly from a first recess and a second recess of the housing, and biasing the cutting assembly with an urging member in an urging direction that is substantially opposite to the actuating direction.

DETAILED DESCRIPTION AND INDUSTRIAL APPLICABILITY

FIGS. 1-7 illustrate an exemplary cutting device 105. The exemplary cutting device disclosed herein may be any suitable device for cutting material. For example, the exemplary disclosed device and method may be used in any application involving cutting material such as scraping material. For example, the exemplary cutting device and method may be used in applications such as removing undesired material from a surface, smoothing or levelling a surface, preparing a surface for a desired use or further treatment, and/or any other suitable application for scraping material. Cutting device 105 may for example be any suitable type of scraper. Cutting device 105 may be a mini scraper. For example, cutting device 105 may be a mini scraper that is easily stored, carried, or transported.

Cutting device 105 may include a housing assembly 110 and a cutting assembly 115. Cutting assembly 115 may be movably disposed in housing assembly 110. The exemplary cutting device may be constructed from any suitable variety of durable materials. For example, some or most of the components of the exemplary cutting device may be formed from plastic or a plastic composite material. Also for example, some or most of the components of the exemplary cutting device may be formed from metal or metal alloy. Further for example, the exemplary cutting device may include ceramic material. For example, cutting device 105 may be formed from plastic, plastic composite, metal, metal alloy, and/or ceramic materials. For example, cutting device 105 may be formed from a variety of materials disclosed herein. For example, housing assembly 110 may be formed partially or substantially entirely from plastic, plastic composite, metal, and/or metal alloy materials. For example, housing assembly 110 may be formed from plastic or metal structural members. Cutting assembly 115 may include components formed from plastic, plastic composite, metal, and/or metal alloy materials and components formed from ceramic materials. Also for example, certain components of cutting device 105 may include specific materials based upon the application or function of a given component. For example, members of cutting device 105 designed to come into contact with a cutting surface and that may be subject to constant friction may include materials resistant to friction such as glass-filled nylon and/or polyamide plastic. For example, cutting device 105 may include any suitable materials for use in a cutting device such as, e.g., a scraper.

Figure 8:
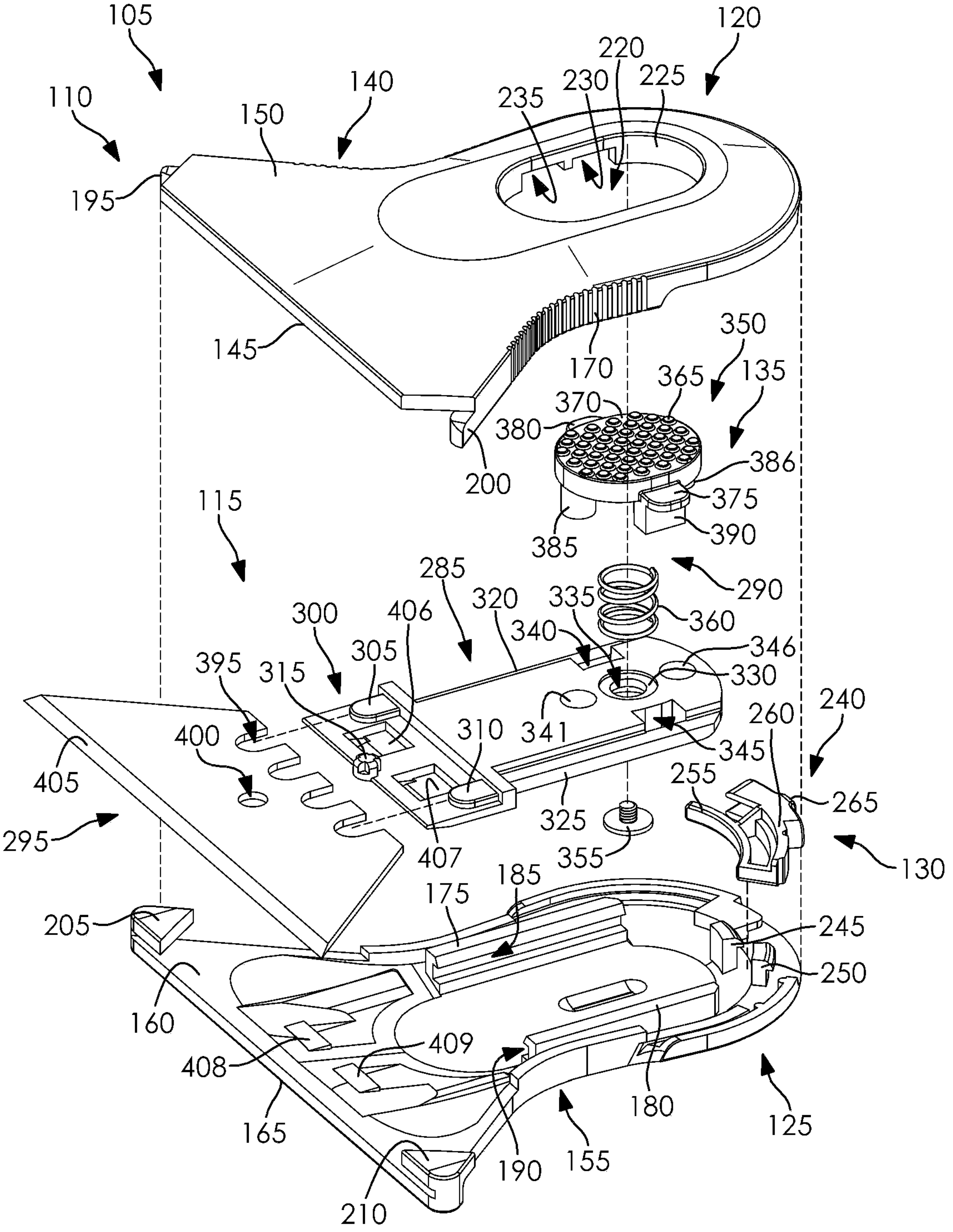
FIG. 8 is an exploded view of an exemplary cutting device in accordance with an embodiment of the present invention.

As illustrated in FIG. 8, housing assembly 110 may include a first housing member 120, a second housing member 125, and a locking assembly 130. Cutting assembly 115 may be received in a cavity formed by first housing member 120 and second housing member 125. Locking assembly 130 may selectively unlock and lock first housing member 120 and second housing member 125 together.

Housing members 120 and 125 may be, for example, corresponding halves of housing assembly 110 that may be attached together to form housing assembly 110. For example, first housing member 120 may be a top member such as, for example, a top-half body shell, and second housing member 125 may be a bottom member such as, for example, a bottom-half body shell. Housing members 120 and 125 may be configured to house or contain (e.g., separately or working together to house or contain) other components of cutting device 105.

Housing assembly 110 may provide, for example, a gripping surface for cutting device 105 for use by a user. For example, housing members 120 and 125 may be attached together to form a substantially hollow housing having a cavity 135 configured to receive and retain other portions of housing assembly 110 and cutting assembly 115. For example, housing assembly 110 may be a substantially flat housing having any desired polygonal shape. For example, housing assembly 110 may have an elliptical shape with a flared or widened end portion (e.g., front end portion). Also for example, housing assembly 110 may include portions having any desired shape such as, for example, a tube shape, a square prism, triangular prism, a hexagonal prism, an octagonal prism, a polygonal prism, and/or any other desired shape.

Figure 9:
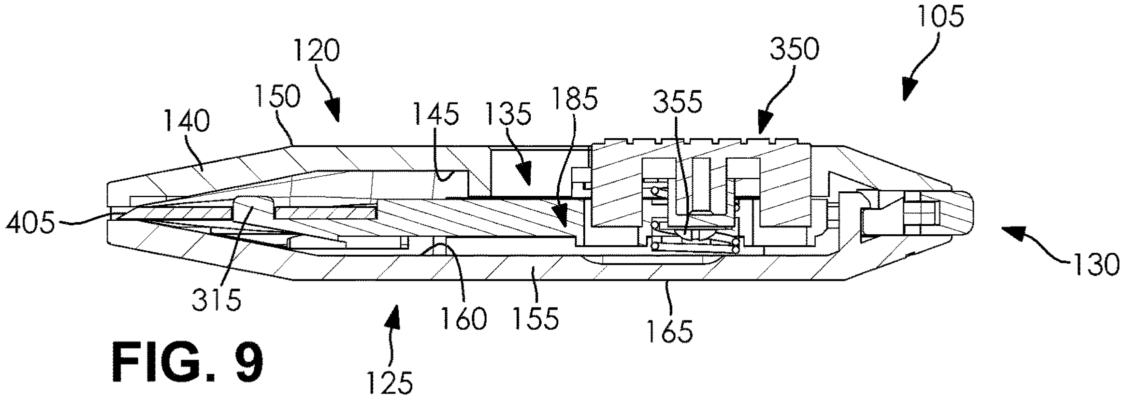
FIG. 9 is a sectional view of an exemplary cutting device in accordance with an embodiment of the present invention.
Figure 10:
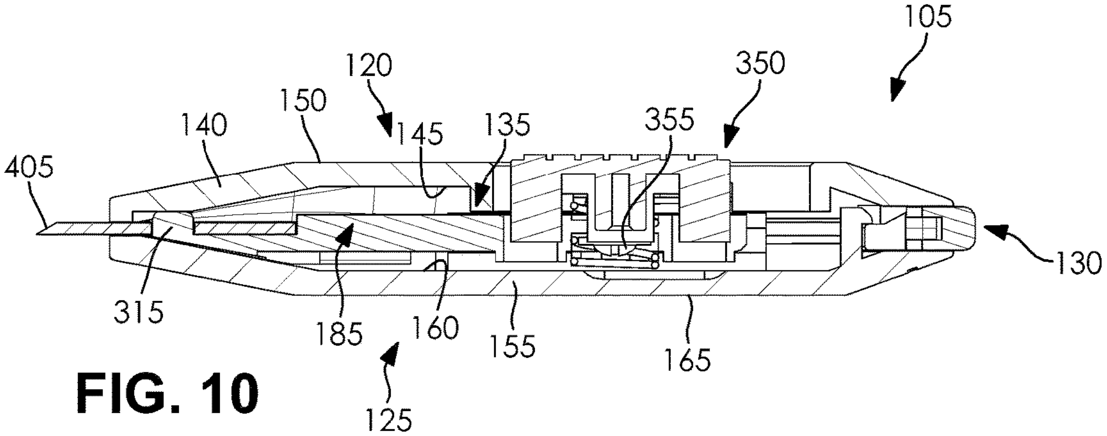
FIG. 10 is a sectional view of an exemplary cutting device in accordance with an embodiment of the present invention.

As illustrated in FIGS. 8-10, first housing member 120 may include a wall portion 140 that may form a portion (e.g., upper portion or half) of cavity 135. Wall portion 140 may include an interior surface 145 facing cavity 135 and an exterior surface 150 that users may grip while holding cutting device 105. Second housing member 125 may include a wall portion 155 that may form a portion (e.g., lower portion or half) of cavity 135. Wall portion 155 may include an interior surface 160 facing cavity 135 and an exterior surface 165 that users may grip while holding cutting device 105. Wall portion 140 may also include protrusions 170 disposed at any desired portion of exterior surface 150 that may assist a user in gripping cutting device 105 (e.g., during scraping). Wall portion 155 may include similar protrusions disposed at any desired portion of exterior surface 165. Wall portions 140 and 155 (e.g., interior surfaces 145 and 160) forming cavity 135 may be shaped, dimensioned, and/or formed to retain other components of housing assembly 110 (e.g., locking assembly 130) and portions of cutting assembly 115. Wall portions 140 and 155 may include recesses, apertures, cavities, protrusions, and/or any other suitable portions disposed at respective interior surfaces 145 and 160 that receive corresponding recesses, apertures, cavities, protrusions, and/or any other suitable portions of housing assembly 110 (e.g., locking assembly 130) and portions of cutting assembly 115. For example, second housing member 125 may include a plurality of protruding portions 175 and 180 including respective recesses 185 and 190 that may be configured to receive portions of cutting assembly 115. Recesses 185 and 190 may be for example elongated recesses that provide tracks allowing for a predetermined movement of cutting assembly 115 within housing assembly 110. For example, recesses 185 and 190 may be substantially straight recesses (e.g., grooves) that receive portions of cutting assembly 115 to allow for a substantially straight movement of cutting assembly 115 as it moves within cavity 135 of housing assembly 110. First housing member 120 may for example include similar protrusions and recesses as an alternative to, or in addition to, recesses 185 and 190 of second housing member 125. Housing members 120 and 125 may include any other suitable recesses, apertures, cavities, protrusions, and/or any other suitable portions disposed at respective interior surfaces 145 and 160 to guide a movement of cutting assembly 115 within cavity 135 of housing assembly 110. For example, housing assembly 110 may include portions facilitating a substantially straight and/or non-rotational movement of cutting assembly 115 within cavity 135 (e.g., a straight movement in which cutting assembly 115 does not rotate).

As illustrated in FIGS. 8-10, housing members 120 and 125 may include a plurality of engagement elements to facilitate removable attachment of housing members 120 and 125. For example, first housing member 120 may include attachment portions 195 and 200 (e.g., as well as other attachment portions) and second housing member 125 may include attachment portions 205 and 210 (e.g., as well as other attachment portions) to facilitate removable attachment of housing members 120 and 125. For example, housing members 120 and 125 may include any suitable portions configured to connect and align housing members 120 and 125 during removable attachment. It is also contemplated that housing members 120 and 125 may be integrally formed with each other and may not be removably attachable.

Figure 1:
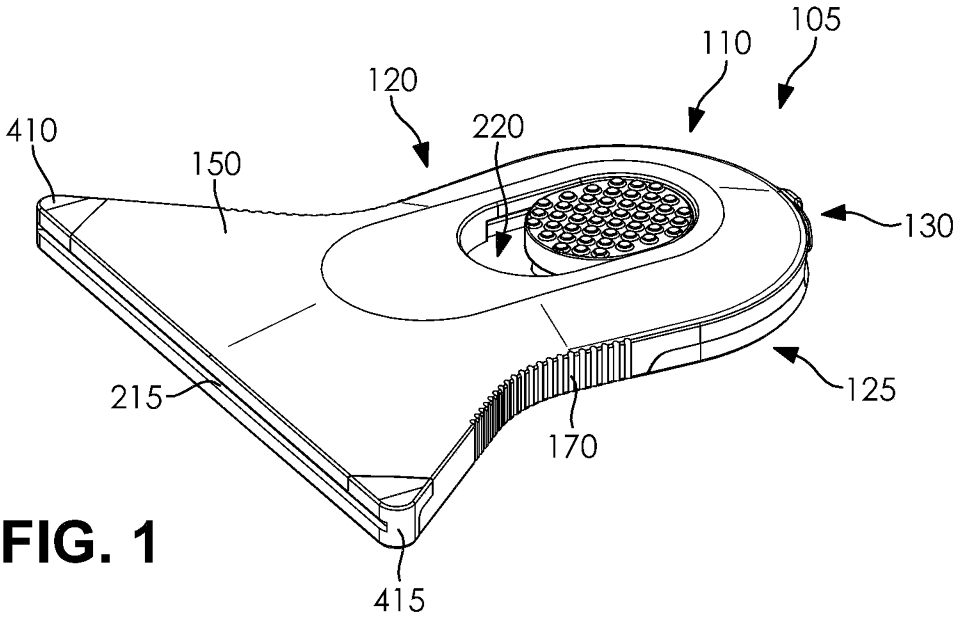
FIG. 1 is a perspective view of an exemplary cutting device in accordance with an embodiment of the present invention.
Figure 6:
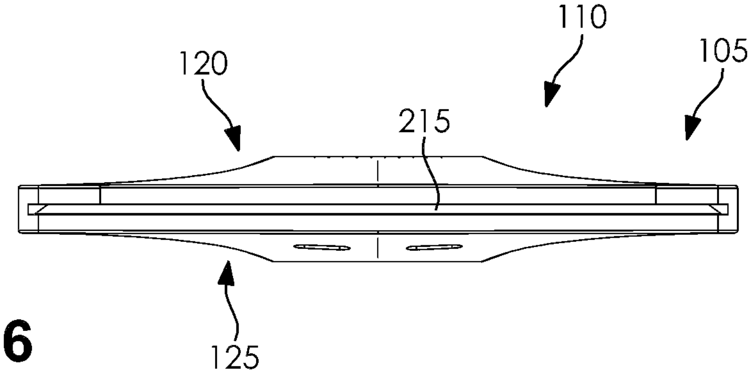
FIG. 6 is a front view of an exemplary cutting device in accordance with an embodiment of the present invention.

When attached, wall portion 140 of housing member 120 and wall portion 155 of housing member 125 may form an aperture 215 as illustrated in FIGS. 1 and 6. Aperture 215 may be located at a front portion of housing assembly 110, and may be configured to receive an exemplary cutting member of cutting assembly 115 as described below. Aperture 215 may be, for example, a blade outlet slot.

As illustrated in FIGS. 1-4 and 8, first housing member 120 (e.g., and/or second housing member 125) may include an aperture 220 formed by a portion 225 (e.g., exterior wall portion) at exterior surface 150. Aperture 220 may be configured to receive an exemplary portion of cutting assembly 115 as disclosed for example herein. Aperture 220 may include a plurality of recesses (e.g., a plurality of recesses 230 and a plurality of recesses 235 disposed on both sides of aperture 220). As disclosed for example below, recesses 230 and 235 may selectively receive a portion of cutting assembly 115 based on a movement of cutting assembly 115 within cavity 135. Aperture 220 may be for example an elongated recess having portion 225 that may define a range of movement of the portion of cutting assembly 115 received in aperture 220, thereby helping to define a range of movement of cutting assembly 115 within cavity 135 of housing assembly 110.

Housing assembly 110 may also include any suitable attachment point to facilitate carrying and/or storage. Housing assembly 110 may also include recesses or other suitable portions for holding a weight (e.g., a metal weight or a weight formed from other relatively heavy material) to facilitate balance of cutting device 105 during use. Housing assembly 110 may further include recesses or other suitable portions for holding a magnet to facilitate storage or transport of cutting device 105. For example, cutting device 105 may include an attachment device, a weight for balancing, and/or a magnet for storage or transport.

As illustrated in FIG. 8, locking assembly 130 may include may include locking member 240 that may be retained in portions of housing members 120 and/or 125. Locking assembly 130 may serve to lock (e.g., selectively lock) housing members 120 and 125 together.

Locking assembly 130 may include a portion that may protrude from interior surface 145 of first housing member 120. Locking assembly 130 may also include a portion 245 and a portion 250 that may protrude from interior surface 160 of second housing member 125. Locking member 240 may further include a notch or channel 262 formed at an end of locking member 240, notch 262 being configured to receive both first housing flange 246 and second housing flange 247. Portions 245 and 250 may be configured to guide, receive, or be received by portions of locking member 240. For example, portion 245 may abut with and guide portion 255 of locking member 240, whereas portion 250 may be movably received within a void 261 formed in a portion 260 of locking member 240. Locking member 240 may be removably disposable on second housing member 125 (e.g., or first housing member 120). For example, when housing members 120 and 125 are detached, locking member 240 may be movably attached to housing member 125 (e.g., to portions 245 and 250). For example, when a user detaches housing members 120 and 125, locking member 240 may remain for example attached to housing member 125. For example, a portion 255 of locking member 240 may be movably disposed between portions 245 and 250. Portion 255 may move between a gap provided between portions 245 and 250, thereby allowing locking member 240 for example to be movably disposed on second housing member 125. It is also contemplated that locking member 240 may alternatively remain attached to first housing member 120 when housing members 120 and 125 are detached. It is also contemplated that in an exemplary embodiment in which housing assembly 110 is an integral housing (e.g., when housing assembly 110 may be formed by a single integral housing member having housing members 120 and 125 that may be integral portions of housing assembly 110), locking member 240 may remain movably attachable to both housing members 120 and 125 of housing assembly 110 (or, e.g., may be omitted).

As illustrated in FIGS. 8-10, when housing members 120 and 125 are attached, locking member 240 may be movably disposed along a plurality of apertures (e.g., a track or a guide) formed by portions 245 and 250 and surface 160 of housing member 125 (e.g., and/or between portions disposed on interior surface 145 of first housing member 120). For example, portions of interior surface 145 of first housing member 120 and/or portions 245 and 250 of surface 160 of second housing member 125 may be in contact with (e.g., and interconnect with) portion 255 and a portion 260 of locking member 240 so that a movement of locking member 240 is guided within housing assembly 110. For example, one or more portions of first housing member 120 and portions 245 and 250 of second housing member 125 may define a range of movement of locking member 240 within housing assembly 110. Additionally or alternatively, portion 250 and void 261 of locking member 240 may cooperate to define a range of movement of locking member 240 within housing assembly 110. Locking member 240 may be moved to a locked position in which portion 255 of locking member 240 may engage (e.g., substantially entirely engage) with one or more portions of first housing member 120 and/or portions 245 and/or 250 of second housing member 125 to lock housing members 120 and 125 together. Locking member 240 may also be moved to an unlocked position in which portion 255 of locking member 240 may be disengaged from one or more portions of first housing member 120 and/or portions 245 and/or 250 of second housing member 125 to unlock housing members 120 and 125. Portion 255 of locking member 240 may thereby selectively engage with one or more portions of first housing member 120 and/or portions 245 and/or 250 of second housing member 125 (e.g., portions of locking member 240 may selectively engage with portions of housing assembly 110 to selectively lock housing assembly 110). Furthermore, locking member may be formed with a notch 262 that selectively receives or otherwise engages with portions of the housing members 120 and 125. When locking member 240 is in a locked position, first housing flange 246 and second housing flange 247 may be covered by and retained within notch 262 of locking member 240, thereby by holding housing members 120 and 125 together. When locking member 240 is in an unlocked position, first housing flange 246 and second housing flange 247 are outside of notch 262 of locking member 240, thereby allowing first housing member 120 to be separable from second housing member 125.

Figure 5:
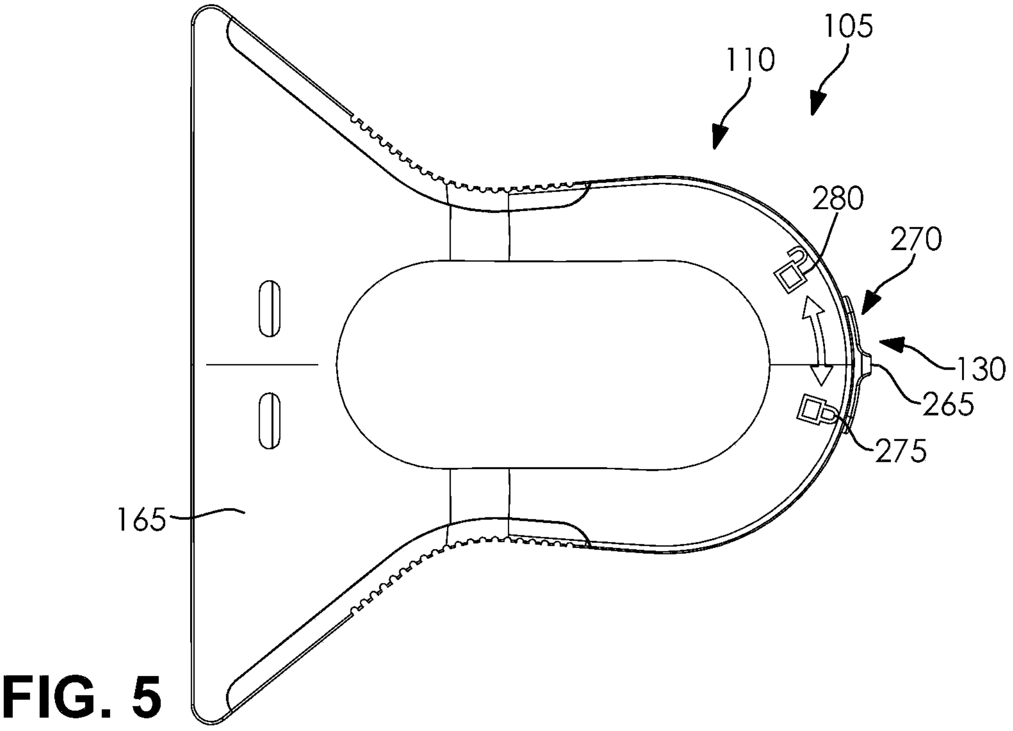
FIG. 5 is a bottom view of an exemplary cutting device in accordance with an embodiment of the present invention.
Figure 7:
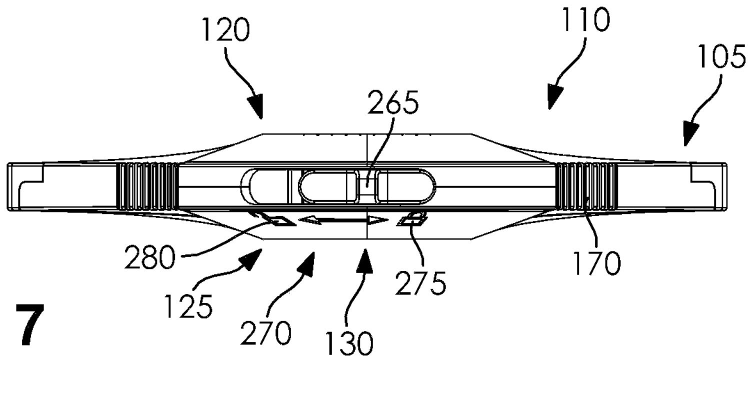
FIG. 7 is a rear view of an exemplary cutting device in accordance with an embodiment of the present invention.

As illustrated in FIGS. 5 and 7, locking member 240 of locking assembly 130 may also include a protrusion 265 disposed at an exterior surface of portion 260. Protrusion 265 may provide a point of contact for assisting a user in selectively moving locking member 240 between a locked and an unlocked position. Locking assembly 130 may also include a locking indicator 270 that may be disposed on first housing member 120 and/or second housing member 125 (e.g., or any other suitable portion of housing assembly 110). Locking indicator 270 may include a locked indicator 275 and an unlocked indicator 280 that may indicate to a user whether cutting device 105 is in a locked or an unlocked state based on a position of locking member 240 (e.g., an engagement of locking member 240 with portions of housing members 120 and 125). It is contemplated that locking assembly 130 may also include any suitable assemblies for locking housing members 120 and 125 such as, for example, a twist-lock connection, a snap connection, a screw-type connection, an adhesive connection, a hook and loop connection, or any other suitable type of (e.g., mechanical) connection.

Figure 2:
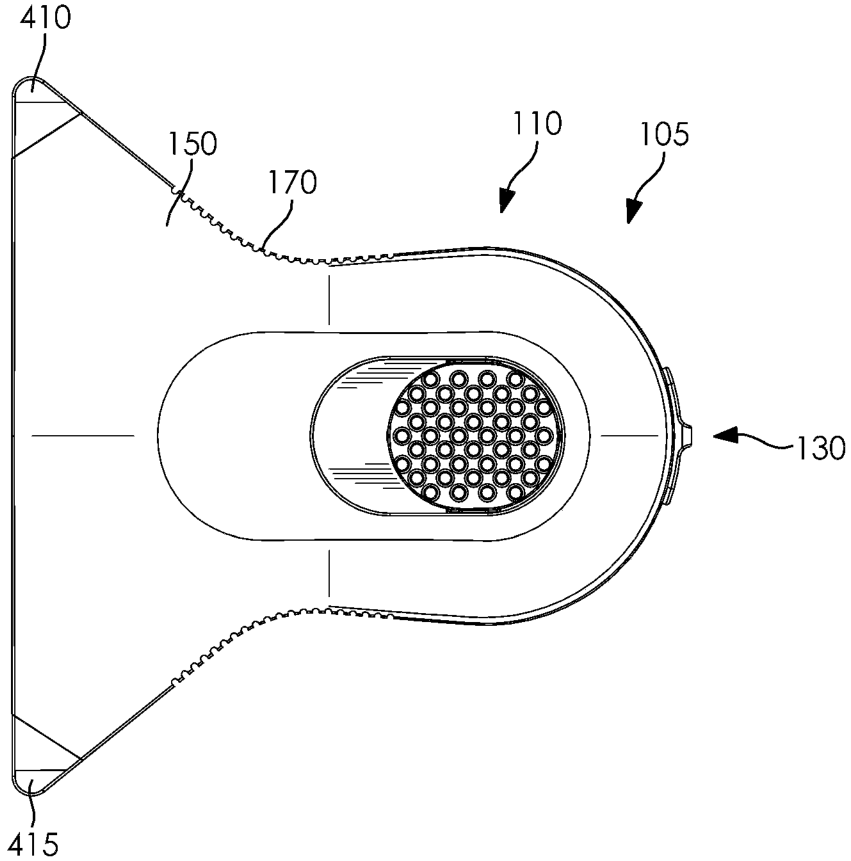
FIG. 2 is a top view of an exemplary cutting device in accordance with an embodiment of the present invention.
Figure 3:
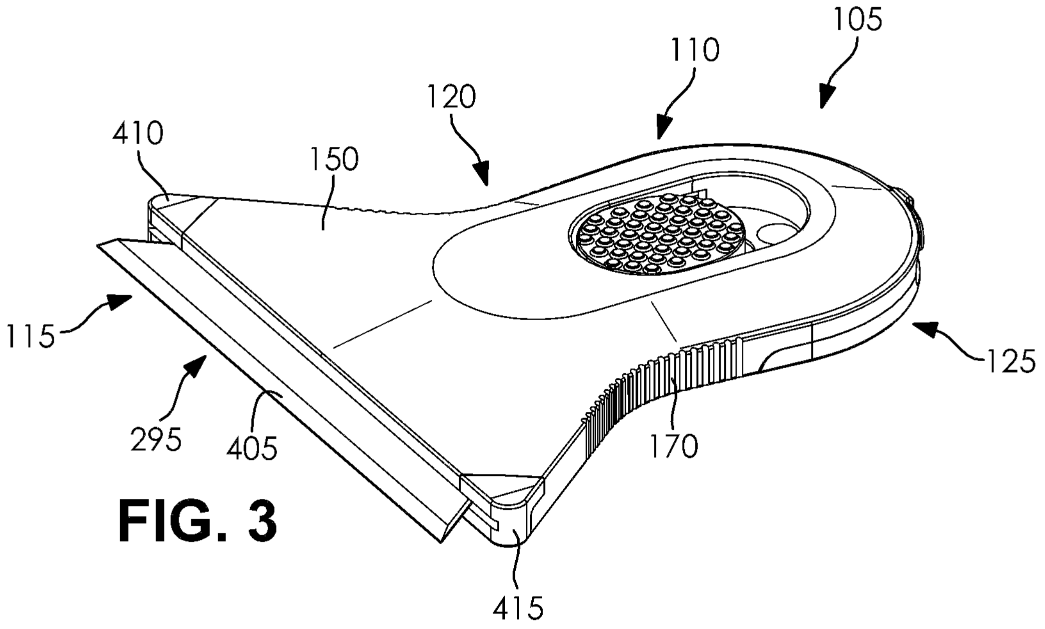
FIG. 3 is a perspective view of an exemplary cutting device in accordance with an embodiment of the present invention.
Figure 4:
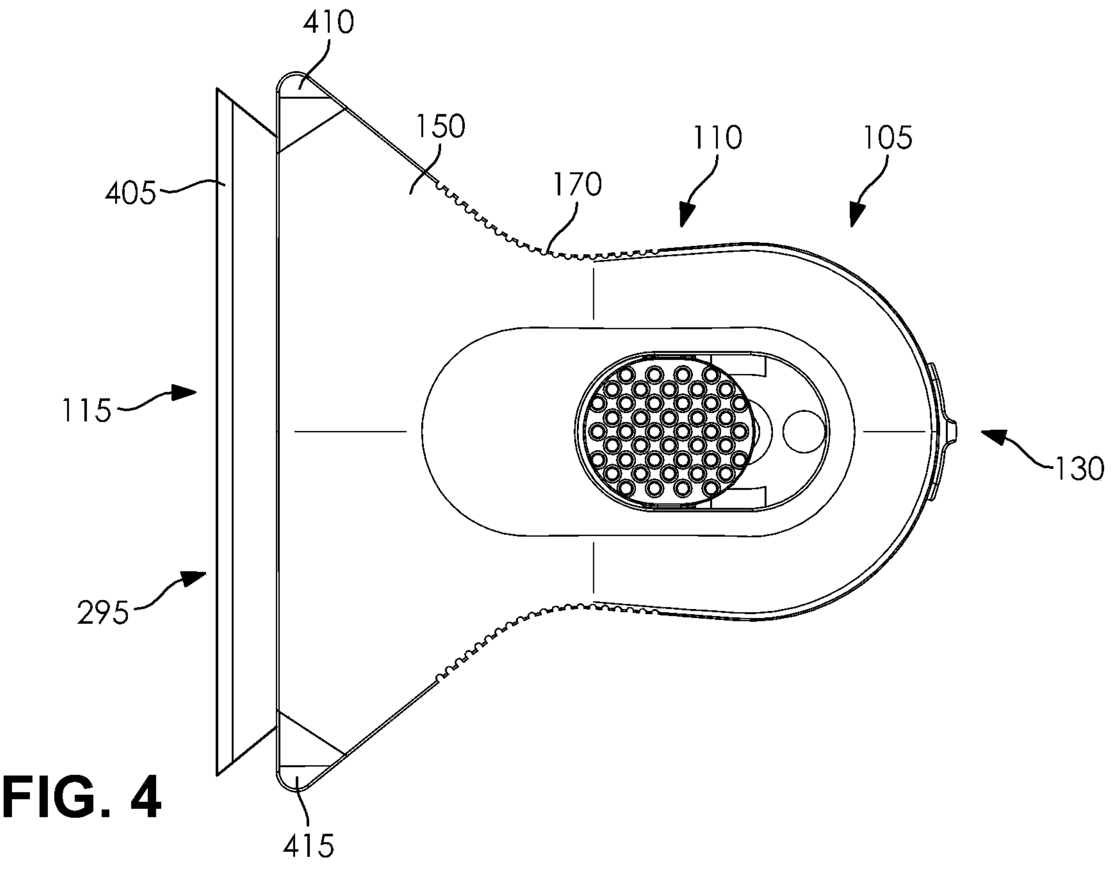
FIG. 4 is a top view of an exemplary cutting device in accordance with an embodiment of the present invention.

As illustrated in FIG. 8, cutting assembly 115 may include a body member 285, an actuating assembly 290, and a cutting member 295. Cutting member 295 may be removably disposable in body member 285. Actuating assembly 290 may operate to move body member 285 and cutting member 295 within cavity 135 of housing assembly 110. For example, cutting assembly 115 may move within housing assembly 110 between a retracted position as illustrated in FIGS. 1 and 2 and an extended position as illustrated in FIGS. 3 and 4. For example, cutting assembly 115 may be moved to the retracted position, the extended position, or any desired position between the retracted position and the extended position.

Returning to FIG. 8, body member 285 may include a blade receiving portion 300 that may be disposed at a front end portion of cutting device 105 (e.g., near aperture 215). Blade receiving portion 300 may include portions 305 and 310 that may be received in portions of cutting member 295. Blade receiving portion 300 may also include a protrusion 315 that may be received in an aperture of cutting member 295 as described for example below. Body member 285 may include any other suitable protrusions, recesses, apertures, and/or any other suitable portions to allow for a removable attachment of cutting member 295 to body member 285. Cutting member 295 may thereby be removably attached to body member 285 by blade receiving portion 300.

Body member 285 may also include a plurality of portions 320 and 325. Portions 320 and 325 may be received by portions of housing assembly 110 to allow for a movement of cutting assembly 115 within cavity 135 of housing assembly 110. For example, portions 320 and 325 may be received in recesses 185 and 190 of second housing member 125. Body member 285, other portions of cutting assembly 115, and/or housing assembly 110 may include any suitable recesses, apertures, cavities, protrusions, and/or any other suitable portions that may interact with each other to provide a desired direction of movement or movement path (e.g., movement track). For example, portions 320 and 325 being received in respective recesses 185 and 190 housing assembly 110 may provide a substantially straight and/or non-rotational movement of cutting assembly 115 within cavity 135 such as a straight movement in which cutting assembly 115 does not rotate. It is also contemplated that a movement path or track of cutting member 115 within housing assembly 110 that is curved, non-linear, and/or rotational may also be provided.

Body member 285 may include a recess 330 that may receive and help to seat or maintain in place an exemplary urging member of actuating assembly 290. An aperture 335 that may receive a portion of actuating assembly 290 may be disposed in body member 285 for example at or near recess 330. A plurality of apertures 340 and 345 for receiving portions of actuating assembly 290 as described for example below may also be disposed in body member 285.

As illustrated in FIG. 8, actuating assembly 290 may include an actuating member 350, a fastener 355, and an urging member 360. As illustrated in FIGS. 9 and 10, fastener 355 may fasten urging member 360 to body member 285. Additionally, the fastener 355 may attach to a central protrusion 358 formed on the actuating member 350.

Returning to FIG. 8, actuating member 350 may include a plurality of protrusions 365 such as ridges or other suitable tactile protrusions disposed on a surface 370 of actuating member 350. A user of cutting device 105 may interact with actuating member 350 to move cutting assembly 115 within housing assembly 110. Protrusions 365 may assist a user with maintaining positive contact (e.g., non-slipping contact) with actuating member 350 as the user pushes or pulls at actuating member 350. Actuating member 350 may also include a plurality of protrusions 375 and 380 that may be selectively received by respective recesses 230 and 235 on both sides of aperture 220 based on a movement of cutting assembly 115 within cavity 135. Actuating member 350 may also include a plurality of protrusions 385 and 390 that may be received (e.g., slidably received) by apertures in the body member 285. For example as described below, protrusion 390 and a corresponding protrusion, not visible in FIG. 8, on the opposite side edge of the actuating member 350 may be movably received in respective apertures 345 and 340, while protrusions 385 and 386 are movably received in respective apertures 341 and 346. As best shown by FIGS. 9 and 10, the actuation member may further include a central protrusion 358 formed on a central portion of the bottom of the actuating member 350.

As illustrated in FIGS. 8-10, fastener 355 may be received in aperture 335 of body member 285. Fastener 355 may for example attach urging member 360 to body member 285. Additionally, the fastener 355 may attach to a central protrusion 358 formed on the actuating member 350. Fastener 355 may be any suitable element for fastening urging member 360 (e.g., or any other desired component of cutting device 105) such as, for example, a threaded member, a press-fit member, a snap-fit member, an adhesive member, and/or any other suitable fastening component. Fastener 355 may thereby help to maintain components of actuating assembly 290 in a desired position during an operation of actuating assembly 290 and cutting device 105.

Urging member 360 may apply an urging force to actuating member 350 that urges actuating member 350 away from body member 285 and toward first housing member 120. In some embodiments, the urging member 360 surrounds the central protrusion 358 formed on the actuating member 350. Urging member 360 may thereby apply an urging force to actuating member 350 that urges protrusions 375 and 380 to be retained in respective recesses 230 and 235 on both sides of aperture 220. Urging member 360 may be a potential-energy-storing member. Urging member 360 may be any suitable member that may be for example stretched and unstretched and/or compressed and uncompressed. Urging member 360 may be urged or biased between a neutral or unbiased state (e.g., storing substantially no potential energy) and a biased state (e.g., storing potential energy). Urging member 360 may be, for example, a tension member or a compression member. For example, urging member 360 may be a spring having a plurality of coils. For example, urging member 360 may move from a compressed position toward a partially uncompressed position when protrusions 375 and 380 are received in recesses 230 or 235. Urging member 360 may also be an elastic member or elastic band, a cable, a wire, and/or a member formed from materials having elastic or resilient properties and capable of being stretched and unstretched (e.g., or compressed and uncompressed). Urging member 360 may be formed from any suitable materials for forming a tension member or a compression member (e.g., that can be stretched and unstretched, or compressed and uncompressed) such as metallic material, plastic material, composite material, elastomeric material, natural rubber, and/or synthetic rubber. For example, urging member 360 may be a metallic, plastic, or composite spring. Also for example, urging member 360 may be a rubber band or an elastomeric cable, wire, or cord.

Cutting member 295 may be removably attachable to blade receiving portion 300 of body member 285. Cutting member 295 may include a plurality of recesses 395. One or more recesses 395 may for example receive portions of body member 285 (e.g., portions 305 and/or 310). Cutting member 295 may also include an aperture 400 that may receive protrusion 315 of body member 285. Cutting member 295 may include any other suitable protrusions, recesses, apertures, and/or any other suitable portions to allow for a removable attachment of cutting member 295 to body member 285.

Cutting member 295 may be any suitable blade, cutter, or scraper for cutting or scraping of a material by cutting device 105. For example, cutting member 295 may be formed from a ceramic material that is capable of withstanding extended use before becoming dull or unusable. For example, cutting member 295 may be a ceramic blade or scraper. For example, cutting member 295 may include ceramic materials such as Zirconium Oxide or any other suitable ceramic materials for use in a blade. For example, cutting member 295 may be a ceramic blade that may be a scraper blade formed from Zirconium Oxide. Alternatively for example, cutting member 295 may be a metal blade or a blade formed from any suitable material than can be used for cutting or scraping materials. Cutting member 295 may include rounded tips to reduce the chance of a user being cut unintentionally by cutting member 295.

As illustrated in FIGS. 3, 4, and 8, cutting member 295 may include a portion 405 that may be used for cutting material. Cutting member 295 may be of any suitable shape or configuration for cutting material. Portion 405 may be a relatively narrow portion (e.g., narrower relative the other portions of cutting member 295) of cutting member 295 that may serve to cut material.

As illustrated in FIG. 8, body member 285 may include portions 406 and 407, and second housing member 125 may include portions 408 and 409. It is also contemplated that first housing member 120 may include portions 408 and 409. Portions 406 and 407 may be for example portions that protrude from body member 285. For example, portions 406 and 407 may be tabs or tab portions. Portions 408 and 409 may form recess portions that may be configured to receive portions 406 and 407, respectively. For example, portions 408 and 409 may be slots or slot portions that may receive portions 406 and 407, respectively. For example, when body member 285 (e.g., cutting assembly 115) is moved to an extended position, portion 406 may be moved to be received by portion 408, and portion 407 may be moved to be received by portion 409. Body member 285 may be thereby secured or attached to second housing member 125 when cutting assembly 115 is in the extended position. When cutting device 105 is being used (e.g., when cutting member 295 in the extended position is pressed against or pushed down against a work piece such as a material being scraped), the engagement of portions 406, 407, 408, and 409 may substantially prevent housing members 120 and 125 from separating based on the force or pressure applied to cutting device 105.

As illustrated in FIGS. 1-4, cutting device 105 may include front corner portions 410 and 415. Portions 410 and 415 may be sized (e.g., dimensioned) to allow a user to turn or rotate cutting device 105 during use (e.g., during scraping) so that a side edge of cutting member 295 may scrape near a wall or side edge of an object without portions 410 and 415 bumping into or abutting that side edge. For example, corner portions 410 and 415 may be curved or rounded corner portions. This may for example allow a user to cut or scrape otherwise inaccessible areas.

In at least some exemplary embodiments, the exemplary disclosed cutting device may include a first housing member (e.g., first housing member 120), a second housing member (e.g., second housing member 125) that is removably attachable to the first housing member to form a housing, and a cutting assembly (e.g., cutting assembly 115) that is movably disposed in the housing, the cutting assembly including an urging member (e.g., urging member 360), an actuating member (e.g., actuating member 350), and a cutting member (e.g., cutting member 295). The housing may include a first recess (e.g., recess 230) and a second recess (e.g., recess 235). The actuating member may include a protrusion (e.g., protrusion 375 or 380) that may be selectively receivable in the first recess and in the second recess. The urging member may bias the actuating member toward the first and second recesses. The cutting member may be retracted within the housing in a retracted position when the protrusion is received in the first recess, and the cutting member may be extended out of the housing in an extended position when the protrusion is received in the second recess. When the cutting member is in the retracted position, the urging member may bias the protrusion into the first recess. When the cutting member is in the extended position, the urging member may bias the protrusion into the second recess. The cutting assembly may include a body member (e.g., body member 285) that has a plurality of apertures (e.g., apertures 340, 341, 345, and 346) configured to receive a plurality of second protrusions (e.g., protrusions 385, 386 and 390 and a protrusion (not visible) that is on the side edge of the actuating member 350 opposite of protrusion 390) of the actuating member. The actuating member may be movable relative to the body member based on the plurality of second protrusions being slidably received in the plurality of apertures. When the actuating member moves toward the body member, the urging member may be compressed, and when the actuating member moves away from the body member, the urging member may be uncompressed. The cutting member may be removably attachable to the cutting assembly. The cutting device may further include a locking assembly (e.g., locking assembly 130) that may selectively lock the first housing member to the second housing member. The cutting member may include Zirconium Oxide. The urging member may be a potential-energy-storing member. The actuating member may be a thumbscrew or a knob having a protrusion.

In at least some exemplary embodiments, the exemplary disclosed cutting device may include a first housing member (e.g., first housing member 120), a second housing member (e.g., second housing member 125) that is removably attachable to the first housing member to form a housing, a locking assembly (e.g., locking assembly 130) that may selectively lock the first housing member to the second housing member, a scraping assembly (e.g., cutting assembly 115) that may be movably disposed in the housing, the scraping assembly including an urging member (e.g., urging member 360) and an actuating member (e.g., actuating member 350). The exemplary disclosed cutting device may also include a scraping member (e.g., cutting member 295) that may be removably attachable to the scraping assembly. The housing may include a first plurality of recesses (e.g., recesses 230) and a second plurality of recesses (e.g., recesses 235). The actuating member may include a plurality of protrusions (e.g., protrusions 375 and 380) that may be selectively receivable in the first plurality of recesses and in the second plurality of recesses. The urging member may bias the actuating member toward the first and second plurality of recesses. The urging member may be a spring. The scraping member may be a ceramic member. A front portion of the scraper may have round corner portions. The scraping assembly may include a protrusion (e.g., protrusion 315), which may be receivable in an aperture (e.g., aperture 400) of the scraping member, and a plurality of portions (e.g., portions 305 and 310) that may be receivable in a plurality of recesses (e.g., recesses 395) of the scraping member.

The exemplary disclosed device and method may provide an intuitively simple and safe technique for cutting materials and/or replacing blades of a cutting device such as, for example, a scraper. The exemplary disclosed device and method may be used in any application involving cutting materials such as scraping material. For example, the exemplary cutting device and method may be used in applications such as removing undesired material from a surface, smoothing or levelling a surface, preparing a surface for a desired use or further treatment, and/or any other suitable application for scraping material.

An exemplary operation of exemplary cutting device 105 will now be described. A user may store, transport, and/or carry cutting device 105 in the retracted position illustrated in FIGS. 1 and 2. Actuating member 350 may be disposed in a rear position of aperture 220 in the retracted position. Also in the retracted position, protrusions 375 and 380 may be disposed in recesses 230 of aperture 220. Urging member 360 may urge or bias against actuating member 350, which may urge protrusions 375 and 380 upward against surfaces of recesses 230. Urging member 360 may thereby help to retain protrusions 375 and 380 in recesses 230. Actuating assembly 290 may thereby be maintained at a rear position of aperture 220, which may maintain cutting device 105 in the retracted position. In the retracted position, portion 405 of cutting member 295 may be retracted in cavity 135 and may not extend through aperture 215.

A user may change cutting device 105 from the retracted state illustrated in FIGS. 1 and 2 to the extended state illustrated in FIGS. 3 and 4. The user may press down on actuating member 350 with an actuating force in a direction toward cavity 135 that exceeds an urging force applied by urging member 360 that urges actuating member 350 upward toward surfaces of recesses 230. Actuating member 350 may thereby be moved toward cavity 135 (e.g., toward an interior of cutting device 105), compressing urging member 360, and thereby moving protrusions 375 and 380 out of recesses 230. Once protrusions 375 and 380 have been removed from recesses 230, actuating member 350 may be free to move in an extending direction toward a front portion of cutting device 105. Actuating member 350 may be moved toward a front position of aperture 220. Once actuating member 350 has been moved to the front position of aperture 220 in an extended position (e.g., with a front portion of actuating member 350 abutting against a front wall portion of portion 225), protrusions 375 and 380 may be substantially aligned with recesses 235. In the extended position, portion 405 of cutting member 295 may be extended in cavity 135 and may extend through aperture 215. Once the user reduces an actuating force (e.g., reduces pressing force) on actuating member 350 or releases actuating member 350, the urging force applied by urging member 360 may exceed the opposing actuating force. The urging force applied by urging member 360 may urge actuating member 350 away from cavity 135, which may urge protrusions 375 and 380 upward against surfaces of recesses 235. Urging member 360 may thereby help to retain protrusions 375 and 380 in recesses 235. Actuating assembly 290 may thereby be maintained at a front position of aperture 220, which may maintain cutting device 105 in the extended position. In the extended position (e.g., as illustrated in FIGS. 3 and 4), portion 405 of cutting member 295 may be extended in cavity 135 and may be maintained in a position extending through aperture 215. A user may then use cutting device 105 maintained in the extended position to cut material as desired.

At any desired time, a user may change cutting device 105 from the extended state illustrated in FIGS. 3 and 4 back to the retracted state illustrated in FIGS. 1 and 2 by following steps similar to those described above. For example, the user may press down on actuating member 350 with an actuating force in a direction toward cavity 135 that exceeds an urging force applied by urging member 360 (e.g., the urging force urging actuating member 350 upward toward surfaces of recesses 235). Actuating member 350 may thereby be moved toward cavity 135 (e.g., toward an interior of cutting device 105), compressing urging member 360, and thereby moving protrusions 375 and 380 out of recesses 235. Once protrusions 375 and 380 have been removed from recesses 235, actuating member 350 may be free to move in a retracting direction toward a rear portion of cutting device 105. For example, a user may move actuating member 350 toward a rear position of aperture 220. Once actuating member 350 has been moved to the rear position of aperture 220 in the retracted position (e.g., with a rear portion of actuating member 350 abutting against a rear wall portion of portion 225), protrusions 375 and 380 may be substantially aligned with recesses 230. In the retracted position, portion 405 of cutting member 295 may be again retracted in cavity 135 and may not extend through aperture 215. Once the user reduces an actuating force (e.g., reduces a pressing force) on actuating member 350 or releases actuating member 350, the urging force applied by urging member 360 may exceed the opposing actuating force. The urging force applied by urging member 360 may urge actuating member 350 away from cavity 135, which may urge protrusions 375 and 380 upward against surfaces of recesses 230. Urging member 360 may thereby help to retain protrusions 375 and 380 in recesses 230. Actuating assembly 290 may thereby be maintained at a rear position of aperture 220, which may maintain cutting device 105 again in the retracted position as described for example above.

The user may unlock cutting device 105 by moving locking assembly 130 from the exemplary locked position (e.g., at locked indicator 275) to the exemplary unlocked position (e.g., at unlocked indicator 280) by pushing (e.g., or pulling or toggling) protrusion 265. When cutting device 105 is unlocked, a user may detach first housing member 120 from second housing member 125 as illustrated in FIG. 8. As described for example above, cutting assembly 115 may be retained on second housing member 125 (e.g., or first housing member 120) when a user detaches first housing member 120 from second housing member 125.

When housing members 120 and 125 are detached from each other, a user may replace cutting member 295 as desired. For example, the user may detach an existing cutting member 295 from cutting assembly 115 so that protrusion 315 is removed from aperture 400 and portions 305 and 310 are removed from recesses 395. The user may then attach a new cutting member 295 to cutting assembly 115 by inserting protrusion 315 into aperture 400 and inserting portions 305 and 310 into recesses 395. Housing members 120 and 125 may then be reattached to each other and locked to each other by moving locking assembly 130 from the exemplary unlocked position (e.g., at unlocked indicator 280) to the exemplary locked position (e.g., at locked indicator 275) by pushing (e.g., or pulling or toggling) protrusion 265.

Figure 11:
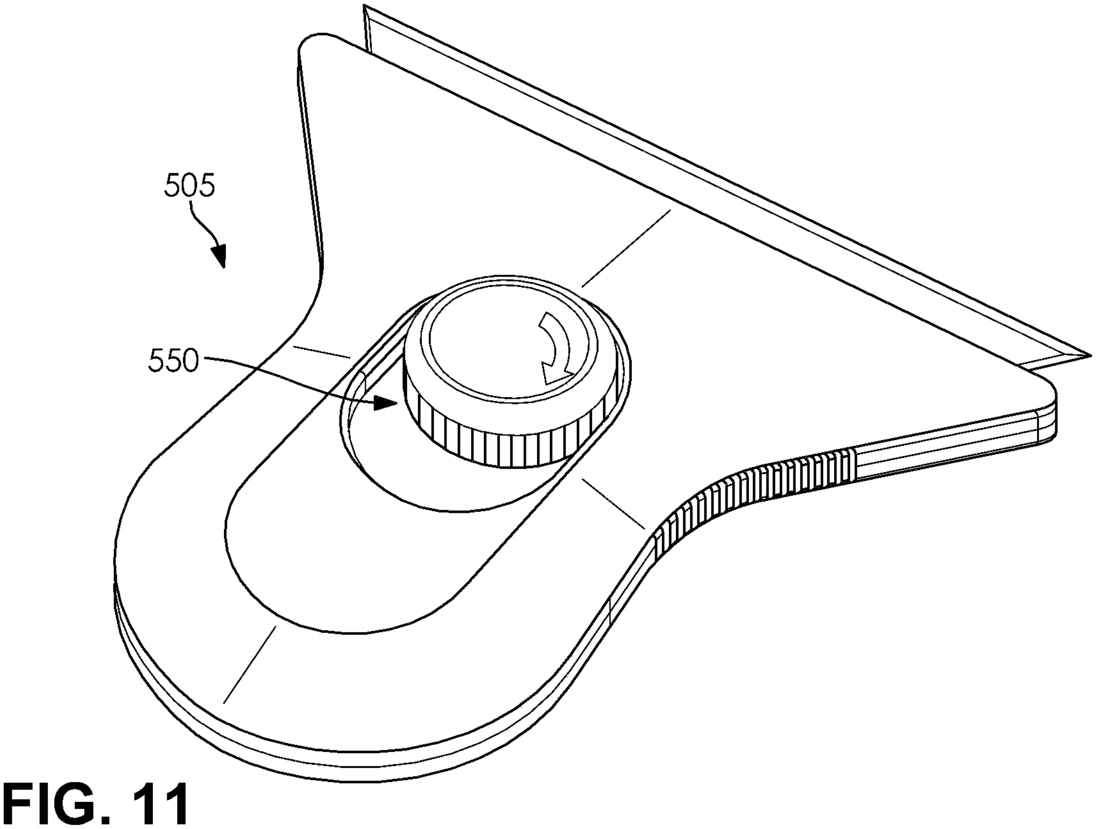
FIG. 11 is a perspective view of an exemplary cutting device in accordance with an embodiment of the present invention.
Figure 12:
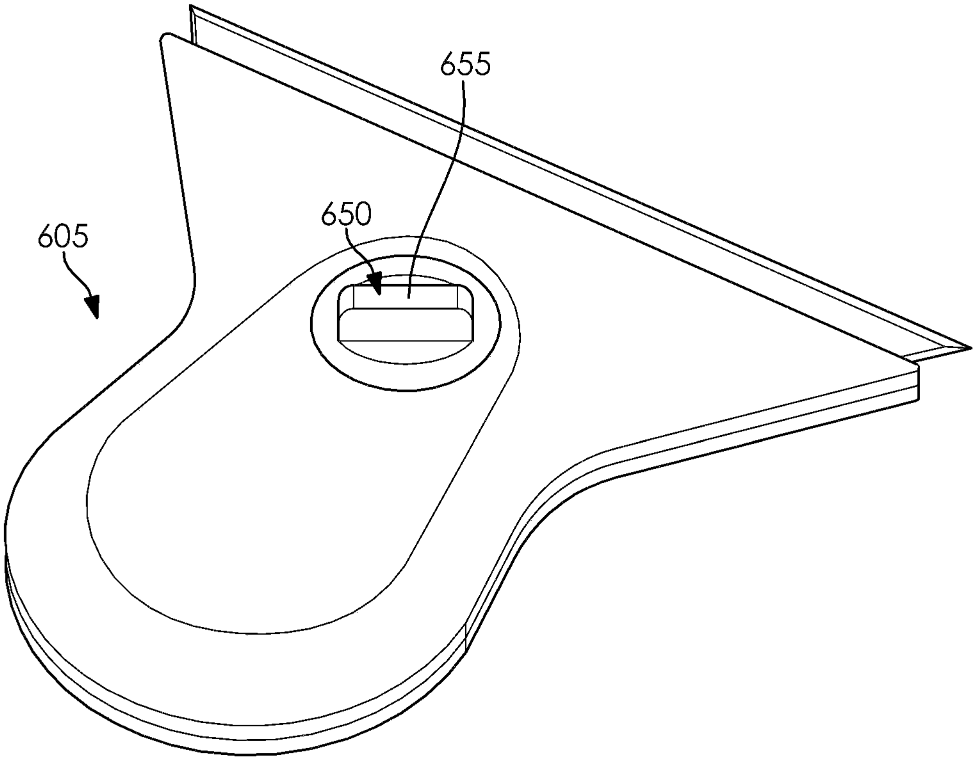
FIG. 12 is a perspective view of an exemplary cutting device in accordance with an embodiment of the present invention.

FIG. 11 illustrates an additional exemplary embodiment of the exemplary cutting device. Cutting device 505 may include components that are generally similar to cutting device 105. Cutting device 505 may include an actuating member 550 that may actuate an actuating assembly that may be similar to actuating assembly 290. Actuating member 550 may also act as a locking assembly that selectively unlocks and locks removably attachable housing members together. For example, actuating member 550 may be a removable fastener that may be removably attached to other components of cutting device 505 to provide a locking assembly that selectively locks housing members of cutting device 505 together. For example, actuating member 550 may be a threaded fastener such as a thumbscrew that may be rotated (e.g., unscrewed) when desired and removed from cutting device 505 so that housing members of cutting device 505 may be detached from each other. Actuating member 550 may also move within an aperture of cutting device 505 that may be similar to aperture 220. In at least some exemplary embodiments as illustrated in FIG. 12, a cutting device 605 that may be generally similar to cutting device 505 may include an actuating member 650 that may be for example a knob having a protrusion 655 to facilitate rotation by a user (e.g., to selectively unlock cutting device 605 so that housing members may be detached from each other when desired).

Figure 13:
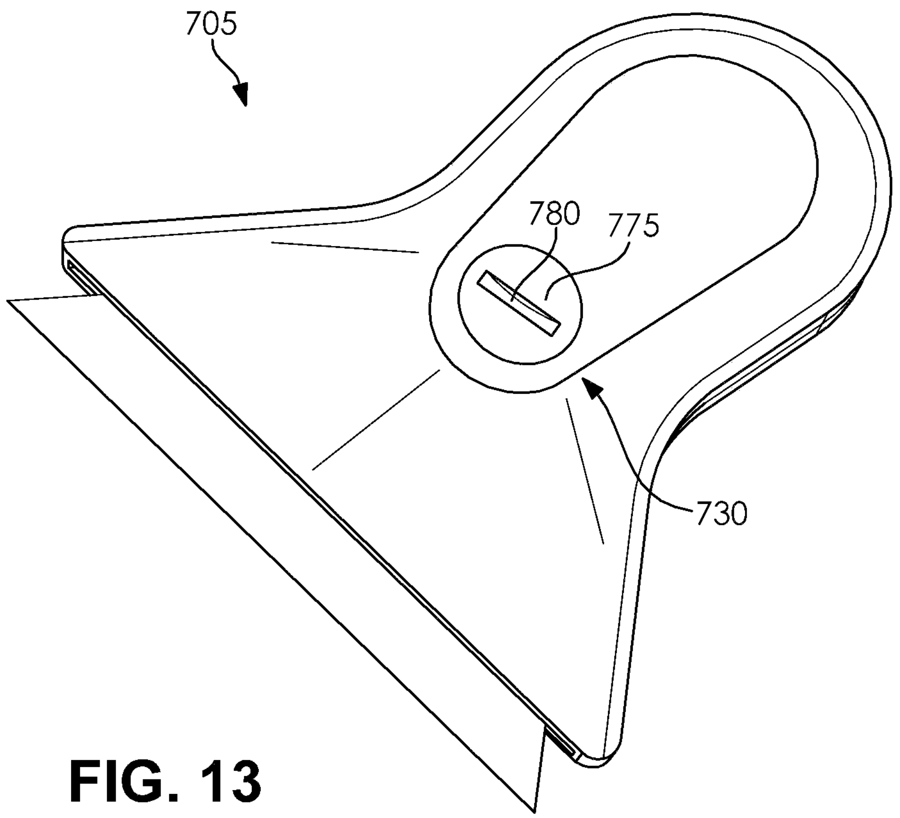
FIG. 13 is a perspective view of an exemplary cutting device in accordance with an embodiment of the present invention.

FIG. 13 illustrates an additional exemplary embodiment of the exemplary cutting device. Cutting device 705 may include components that are generally similar to cutting device 105. Cutting device 705 may include a locking assembly 730 that may selectively unlock and lock housing members of cutting device 705 together. Locking assembly 730 may be a different assembly than an actuating assembly that may also be included on cutting device 705 (e.g., the exemplary actuating assembly may include an actuating member disposed on an opposite side of the side of cutting device 705 depicted in FIG. 13). Locking assembly 730 may include a fastener 775 that may removably fasten housing members of cutting device 705 together. For example, fastener 775 may be a rotatable fastener that may be selectively rotated and removed from other components of cutting device 705 to detach exemplary housing members. For example, fastener 775 may be a threaded fastener. Fastener 775 may for example include a recess 780 (e.g., groove) that may receive a tool to rotate (e.g., screw or unscrew) fastener 775 for removal and insertion into cutting device 705.

In at least some exemplary embodiments, the exemplary disclosed method may include removably attaching a first housing member (e.g., first housing member 120) to a second housing member (e.g., second housing member) to form a housing, selectively locking the first housing member to the second housing member, selectively unlocking the first housing member from the second housing member, movably disposing a cutting assembly (e.g., cutting assembly 115) in the housing, selectively moving the cutting assembly between an extended position and a retracted position based on pressing the cutting assembly in an actuating direction that selectively removes a protrusion (e.g., protrusion 375 and 380) of the cutting assembly from a first recess (e.g., recess 230) and a second recess (e.g., recess 235) of the housing, and biasing the cutting assembly with an urging member (e.g., urging member 360) in an urging direction that is substantially opposite to the actuating direction. The exemplary disclosed method may also include removably attaching a cutting member (e.g., cutting member 295) to the cutting assembly when the first and second housing members are unlocked and detached from each other. Selectively removing the protrusion of the cutting assembly from the first recess and the second recess may include pressing the cutting assembly with an actuating force in the actuating direction that is greater than an urging force applied in the urging direction by the urging member.

The exemplary disclosed cutting device and method may provide an intuitively simple device and technique for using a cutting device and for safely and easily replacing blades of the cutting device for cutting or scraping a surface of a material. The exemplary disclosed device and method may provide a quick and efficient way to change between a mode in which a blade such as a scraping blade is exposed and a mode in which the blade is safely covered or retracted. The exemplary disclosed device and method may also provide an efficient technique for replacing blades of a cutting device such as a scraper. The exemplary disclosed device and method may also provide a technique for avoiding loss or misplacement of blade covers and avoiding accidental cutting by or damage to cutting members.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed cutting device and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A cutting device, comprising:

a first housing member having an actuating aperture that extends through an entire thickness of the first housing member;

a second housing member that is removably attachable to the first housing member to form a housing, the second housing member including a pair of body member rails formed on an interior surface of the second housing member to provide a body member track; and a cutting assembly that is movably disposed in the housing, the cutting assembly including an urging member, an actuating member that is movably disposed in the actuating aperture, a cutting member, and a body member slidably received in the body member track, the body member being a monolithic piece having a first end formed with a cutting member holder and second end formed with a plurality of actuating member holes;

wherein the housing includes a first recess, a second recess, a third recess, and a fourth recess;

wherein the actuating member includes a first recess protrusion that is selectively receivable in the first recess and in the second recess, a second recess protrusion that is selectively receivable in the third recess and in the fourth recess, and a plurality of body member protrusions extending toward the body member from a bottom portion of the actuating member, the plurality of body member protrusions including a central body member protrusion located on a central portion of the actuating member;

wherein the urging member surrounds the central body member protrusion and biases the actuating member away from the body member and toward one or more of the first, second, third, and fourth recesses; and wherein each of the actuating member holes corresponds to one of the body member protrusions of the actuating member and the body member protrusions are slidably received within the actuating member holes;

wherein sliding the actuating member in a first direction toward a front edge of the cutting device causes the cutting member to be extended from the housing.

2. The cutting device of claim 1, wherein the cutting member is retracted within the housing in a retracted position when the first recess protrusion is received in the first recess and the second recess protrusion is received in the third recess, and the cutting member is extended out of the housing in an extended position when the first recess protrusion is received in the second recess and the second recess protrusion is received in the fourth recess.

3. The cutting device of claim 2, wherein:

the urging member is disposed between the body member and the actuating member; and when the cutting member is in the retracted position, the urging member biases the first recess protrusion into the first recess and the second recess protrusion into the third recess.

4. The cutting device of claim 2, wherein when the cutting member is in the extended position, the urging member biases the first recess protrusion into the second recess and biases the second recess protrusion into the fourth protrusion.

5. The cutting device of claim 1, wherein:

the plurality of actuating member holes includes a first actuating member hole and a second actuating member hole and the plurality of body member protrusions includes a first body member protrusion configured to be received in the first actuating member hole and a second body member protrusion configured to be received in the second actuating member hole;

the first actuating member hole is spaced away from the second actuating member hole; and the urging member is disposed between the first body member protrusion and the second body member protrusion.

6. The cutting device of claim 1, wherein:

the first recess, the second recess, the third recess, and the fourth recess are formed in a wall portion of the first housing member that forms the actuating aperture.

7. The cutting device of claim 5, wherein:

when the actuating member moves toward the body member, the urging member is compressed, and when the actuating member moves away from the body member, the urging member is uncompressed;

the third recess and the fourth recess are disposed on an opposite side of the actuating aperture from the first recess and the second recess; and the first recess protrusion, the second recess protrusion, the first body member protrusion, the second body member protrusion, and the urging member are aligned.

8. The cutting device of claim 1, wherein the cutting member holder is configured to align a cutting edge of the cutting member in a perpendicular orientation relative to a longitudinal axis of the body member.

9. The cutting device of claim 8, wherein the first and second housing members align to form a blade outlet slot, the blade outlet slot configured to permit all of the cutting edge of the cutting member to be extended from the housing.

10. The cutting device of claim 1, further comprising a first and second lateral edge that each connect between the first and second ends of the body member, wherein each of the lateral edges are received in one of the body member rails on the interior surface of the second housing.

11. The cutting device of claim 1, wherein a tab portion of the cutting assembly is received in a slot portion of the housing when the cutting member is extended out of the housing in an extended position.

12. A scraper, comprising:

a first housing member having an actuating aperture that extends through a thickness of the first housing member;

a second housing member that is removably attachable to the first housing member to form a housing;

a locking assembly including, a slidable locking member formed with a void, the slidable locking member being pivotable between a locked position and an unlocked position to selectively lock the first housing member to the second housing member one or more protruding portions formed on an interior surface of the second housing member and extending from the interior surface of the second housing member and toward the first housing member, wherein at least one of the protruding portions on the interior surface of the second housing member passes through the void formed in the slidable locking member to retain the slidable locking member on the second housing member;

a scraping assembly that is movably disposed in the housing, the scraping assembly including an urging member, an actuating member that is movably disposed in the actuating aperture, and a body member; and a scraping member that is removably attachable to the scraping assembly;

wherein the housing includes a first plurality of recesses and a second plurality of recesses;

wherein the actuating member includes a plurality of protrusions that are selectively receivable in the first plurality of recesses and in the second plurality of recesses;

wherein the urging member biases the actuating member toward the first and second plurality of recesses;

wherein the urging member is disposed between the plurality of protrusions of the actuating member;

wherein the actuating member includes a plurality of body member protrusions that are spaced apart; and wherein the body member includes a plurality of holes configured to receive the plurality of body member protrusions of the actuating member.

13. The scraper of claim 12, wherein:

the urging member is a spring that is disposed in the actuating aperture between the body member of the scraping assembly and the actuating member.

14. The scraper of claim 12, wherein:

the void passes entirely through the slidable locking member to define a slot that receives the at least one protruding portion; and the at least one protruding portion defines a range of movement for the slidable locking member by abutting with each of the slot.

15. The scraper of claim 12, wherein a front portion of the scraper has round corner portions.

16. The scraper of claim 12, wherein the scraping assembly includes a protrusion, which is receivable in an aperture of the scraping member, and a plurality of portions that are receivable in a plurality of recesses of the scraping member.

17. The scraper of claim 12, wherein a plurality of tabs of the scraping assembly are respectively received in a plurality of slots of the housing when the scraping member is extended out of the housing in an extended position.

18. The scraper of claim 13, wherein:

the plurality of body member protrusions extend vertically down in a first direction from a bottom surface of the actuating member that faces an upper surface of the body member at which the plurality of holes are disposed; and the plurality of protrusions extend from a side surface of the actuating member in a second direction that is perpendicular to the first direction.

19. The scraper of claim 12, wherein:

the slidable locking member is formed with a flange receiving notch; and the locking assembly further includes, a first housing flange formed on a rear perimeter edge of the first housing member, a second housing flange formed on a rear perimeter edge of the second housing member, wherein the flange receiving notch is configured to receive the first and second housing flanges when the slidable locking is in the locked position.

20. The scraper of claim 12, wherein:

an outer portion of the movable locking member is formed with a toggling protrusion.

21. A cutting device, comprising:

a first housing member;

a second housing member that is removably attachable to the first housing member to form a housing; and a cutting assembly that is movably disposed in the housing, the cutting assembly including:

a cutting member;

a body member slidably received within the housing, wherein a first end of the body member is formed with a cutting member holder and second end of the body member is formed with a plurality of actuating member holes;

an actuating member having a top portion that is movably disposed within an aperture formed in the first housing member and a bottom portion that includes a plurality of body member protrusions extending toward the body member from a bottom portion of the actuating member, wherein at least one of the plurality of body member protrusions is a central body member protrusion located on a central portion of the actuating member;

an urging member that surrounds the central body member protrusion and biases the actuating member away from the body member.

* * * * *